June 21, 1960     J. M. DOYLE ET AL     2,942,055

STORAGE BATTERY

Filed Aug. 12, 1957

INVENTOR.
John M. Doyle
BY Garth A. Rowls

Their Attorney

United States Patent Office 2,942,055
Patented June 21, 1960

2,942,055

STORAGE BATTERY

John M. Doyle, Anderson, and Garth A. Rowls, Muncie, Ind., assignors to General Motors Corporation, Detroit, Mich., a corporation of Delaware Filed Aug. 12, 1957, Ser. No. 677,738

1 Claim. (Cl. 136—134)

This invention relates to storage batteries and is particularly concerned with a storage battery having all of its elements completely connected internally of the battery.

It is, therefore, the main object of the invention to provide a storage battery having all electric connections between the several cells thereof within the battery and completely concealed from view.

In carrying out the above object, it is a further object of the invention to provide a storage battery having a one piece cover which seals the several cells one from another and wherein the several cells are connected electrically to one another through the cell partitions without the use of the usual connectors and other external elements normally present in a battery.

Further objects and advantages of the present invention will be apparent from the following description, reference being had to the accompanying drawings wherein preferred embodiments of the present invention are clearly shown.

Figure 1:
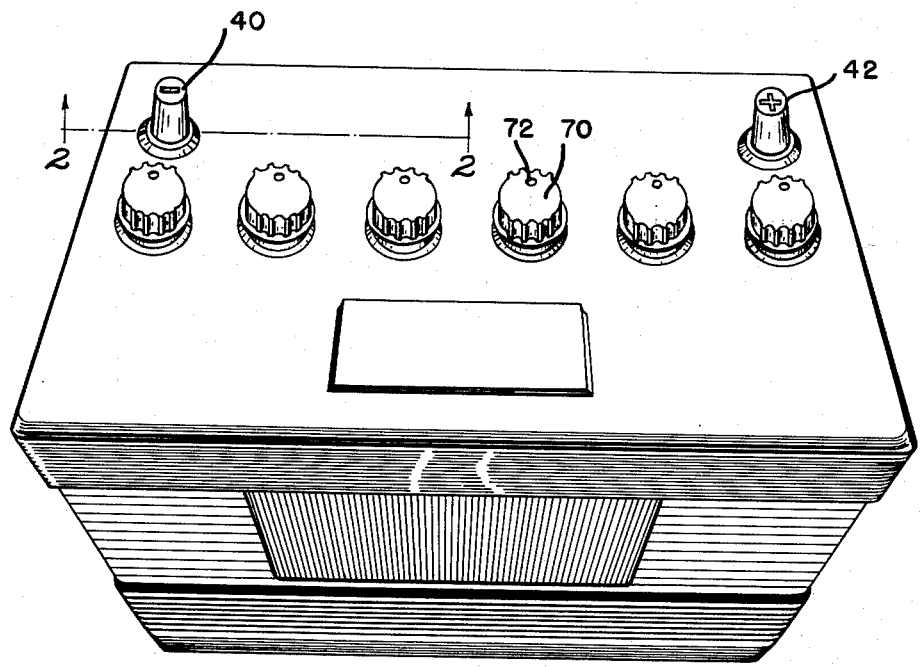
Figure 1 is a view in perspective of a storage battery including the one piece cover and internal electrical connections.
Figure 2:
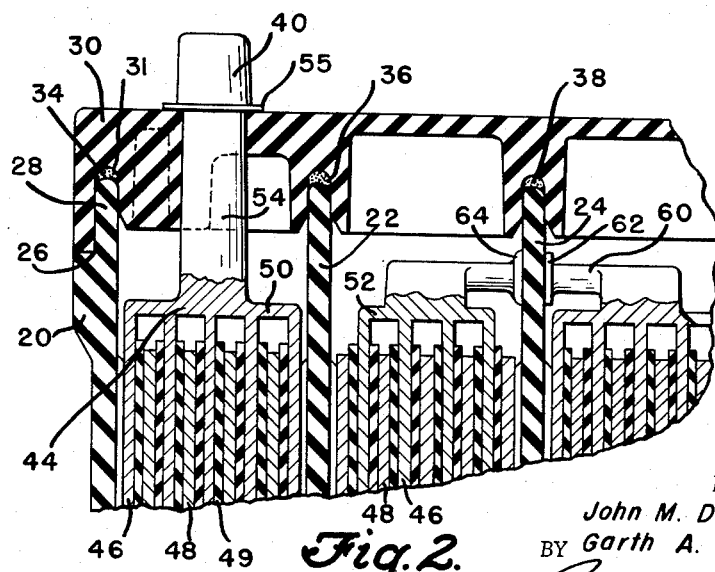
Figure 2 is a fragmentary sectional view taken on line 2—2 of Figure 1 showing the connections between cells and the disposition of the cover with respect to the several cells.

The storage battery as described herein may be made by the method and with the apparatus set forth in copending application, Ser. No. 677,652, filed concurrently herewith.

In the present instance, a battery case 20 is shown made of cured rubber-like material, such as a hard rubber battery case, wherein the several cell partitions shown at 22 and 24 are molded integral with the case. Around the upper periphery of the battery case is a stepped portion 26 which defines an upwardly extending lip, or ridge, 28 that passes entirely around the battery. A cover 30 is provided for the battery case and this cover includes a peripheral groove 31 therearound which fits snugly over the lip 28 to form a fluid tight joint therearound when a sealing compound 34 is placed within the groove 31. The several partitions 22 and 24 extend upwardly to the same height as the lip 28 and the cover 30 includes cooperating grooves 36 and 38 which connect with the groove 31 and are aligned for cooperation with the partition walls 22 and 24. The grooves 36 and 38 are also supplied with a sealing compound and, when the cover is in place, this sealing compound seals the several partitions to the cover as well as sealing the battery cover around its outer periphery to the case.

In this manner, the cover and case are integrated into substantially a one piece enclosure wherein the several cells are maintained sealed from one another so that electrolyte from one cell cannot leak into another.

The cover is also provided with two openings which are aligned with terminal posts 40 and 42 carried on the two end cell groups one of which is shown at 44. Each cell group comprises a plurality of negative grids 46 and positive grids 48 which are connected by connector straps 50 and 52, respectively, and are maintained out of contact by separators 49. The negative strap 50, in one end compartment and the positive strap, not shown, in the other end compartment, have cast thereon connector posts 54 which extend upwardly and pass into and seal the openings in the cover. These posts preferably do not extend outwardly of the cover and, in order to make the terminals 40 and 42, an additional post is cast on the top thereof including a strengthening flange 55 which overlies the top of the cover. This step is accomplished after the cover is assembled to the case through the means of a small mold with the application of flux as disclosed in the aforementioned copending application Ser. No. 677,652, and copending application Ser. No. 677,803, filed concurrently herewith.

All other connector straps 50 and 52, with the exception of the two which include the terminal posts thereon, are connected in series to opposite polarity connector straps in adjacent cells. This is accomplished by punching the partition walls 22 and 24, etc., and passing an inter-cell connector 60 therethrough which may have a shoulder 62 thereon which abuts one side of the partition whereupon the other side of the cell connector is deformed to produce a second flange 64 opposed to the flange 62 and pressing against the other side of the partition. These two flanges hold the inter-cell connector in fluid tight relation with respect to the partition and the ends thereof are then suitably permanently associated to the several connector straps. It is understood that these inter-cell connectors are applied prior to the assembly of the cover to the case and the final casting of the terminal posts. Thus, the several cells in the battery are connected in series arrangement by means of inter-cell connectors passing through and hermetically sealed with respect to the partitions. These inter-cell connectors do not, in any way, extend into the cover nor are they sealed by the assembly of the cover since the entire battery assembly is complete prior to the application of the cover. The sealing of the inter-cell connectors to the partition walls can be simplified by the application of epoxy resin cement thereto although, if a satisfactory deforming operation is obtained, these inter-cell connectors normally are fluid tight with respect to the partitions.

Aligned with each cell compartment, there may be provided a filler opening such as is shown at 70 which includes a filler cap 72 that may screw therein. These caps 72 are vented to permit breathing of the several cells. It is understood that in place of individual openings into the cells with individual vent caps, manifolding may be resorted to for venting and filling of the cells so that only a single vent opening is used. However, this particular modification forms no part of this invention which is basically directed to a storage battery having all of its electrical connections complete within the battery case and including a one piece cover sealing the battery case after these electrical connections are complete. It is understood that in every case, the inter-cell connectors are permanently associated with the partition walls in differentiation to some prior art devices wherein cell connectors have been used which are detachably connected to the walls or which pass through grooves in the walls wherein an attempt is made to seal the groove by application of the cover. All of these prior art devices have caused difficulty due to improper sealing between adjacent cells which permit electrolyte leaks and, in general, cause debilitation of the battery.

The sealing compound which is used in connection with the cover for sealing the cover to the battery case and the partition walls may also be an epoxy resin cement or it may be any other suitable cement such as an asphalt cement which will seal the battery case parts one to another for forming a more or less permanent assembly. In the present instance, handles may be molded into the case or may be applied after the molding operation and form no part of the invention.

The structure disclosed shows a six-cell battery although it is manifest that two or more cells may be assembled in this manner and, therefore, the specific number of cells may vary as required by the end use of the battery.

While the forms of embodiment of the present invention as herein disclosed constitute preferred forms, it is to be understood that other forms might be adopted.

What is claimed is as follows:

A storage battery, comprising in combination; a case including a plurality of integral partitions therein extending upwardly within the case adjacent the top thereof for forming a plurality of separated cell enclosures, a plurality of cell groups each comprising negative plates and positive plates each group being electrically connected together and being separated by suitable separators between said plates, one of said cell groups being positioned within each of said cell enclosures, metallic intercell connectors electrically connecting the adjacent cell groups in series and passing through apertures in the partition walls spaced from the top thereof and permanently and directly associated with and in fluid tight relation thereto for forming a permanent and rigid assembly therewith, a pair of terminal stubs at the opposite end cell groups extending upwardly thereof and above the top of the battery case, a one piece molded cover having a groove therein so formed as to cooperate with the walls of the battery case and the partition walls only and including apertures adapted to receive said stubs, and sealing compound in said groove for sealing the one piece cover to the battery case and to the partition walls.

References Cited in the file of this patent

UNITED STATES PATENTS

| | | |
|---|---|---|
| 1,992,817 | Dunzweiler | Feb. 26, 1935 |
| 2,002,267 | Kyle | May 21, 1935 |
| 2,066,675 | Dunzweiler | Jan. 5, 1937 |
| 2,221,542 | Hopkins | Nov. 12, 1940 |